(No Model.) 3 Sheets—Sheet 1.
J. RYAN.
LUBRICATOR.
No. 363,683. Patented May 24, 1887.
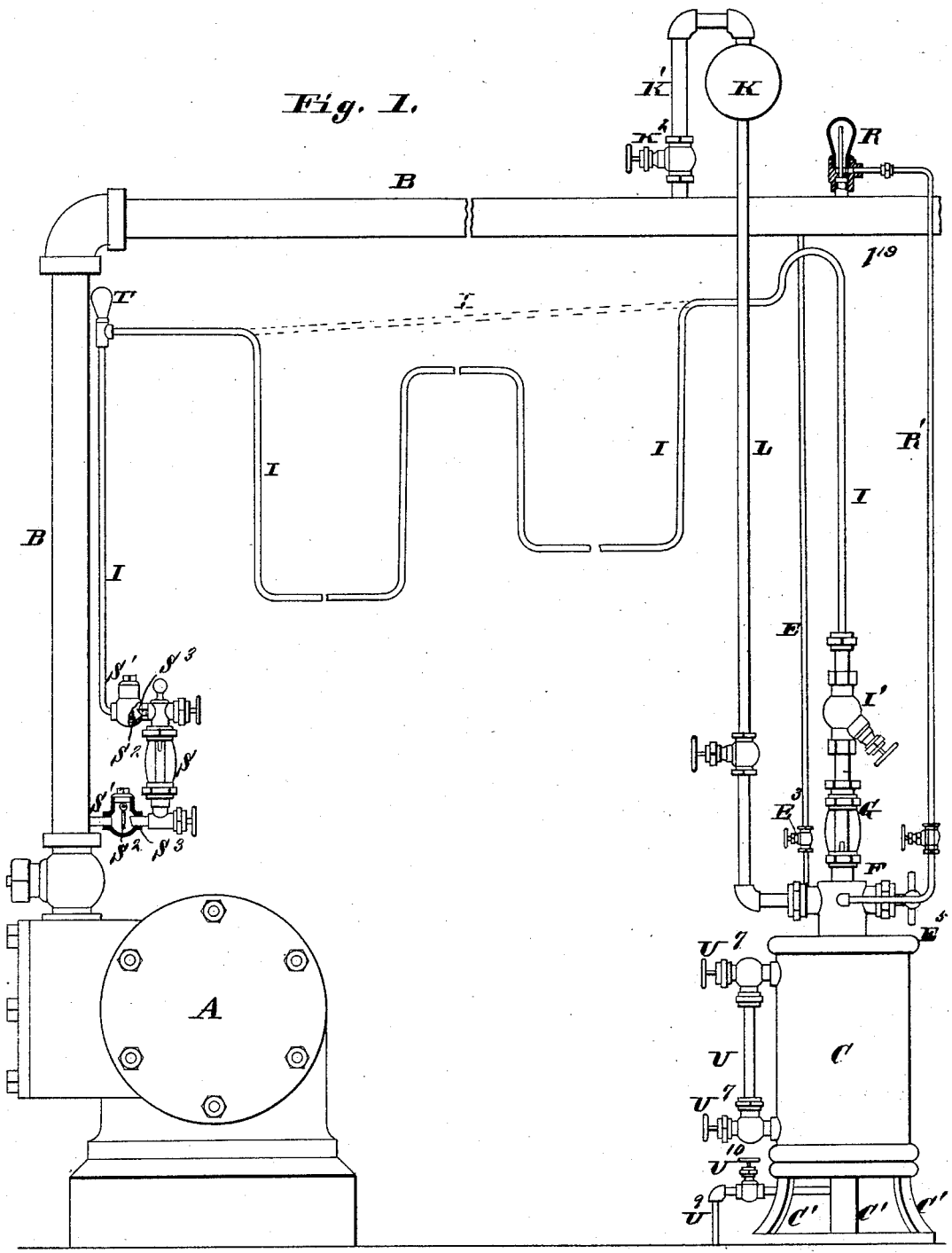

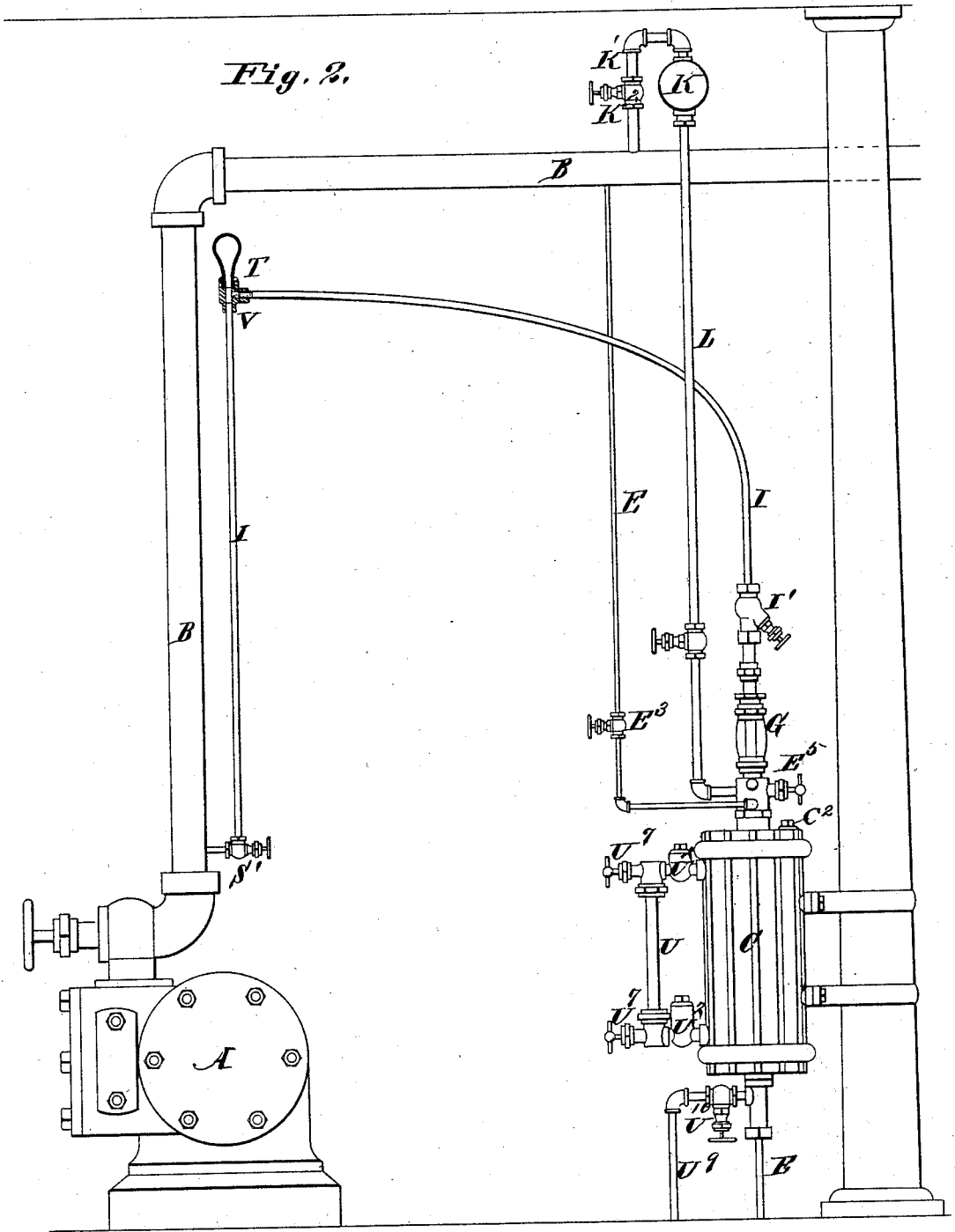

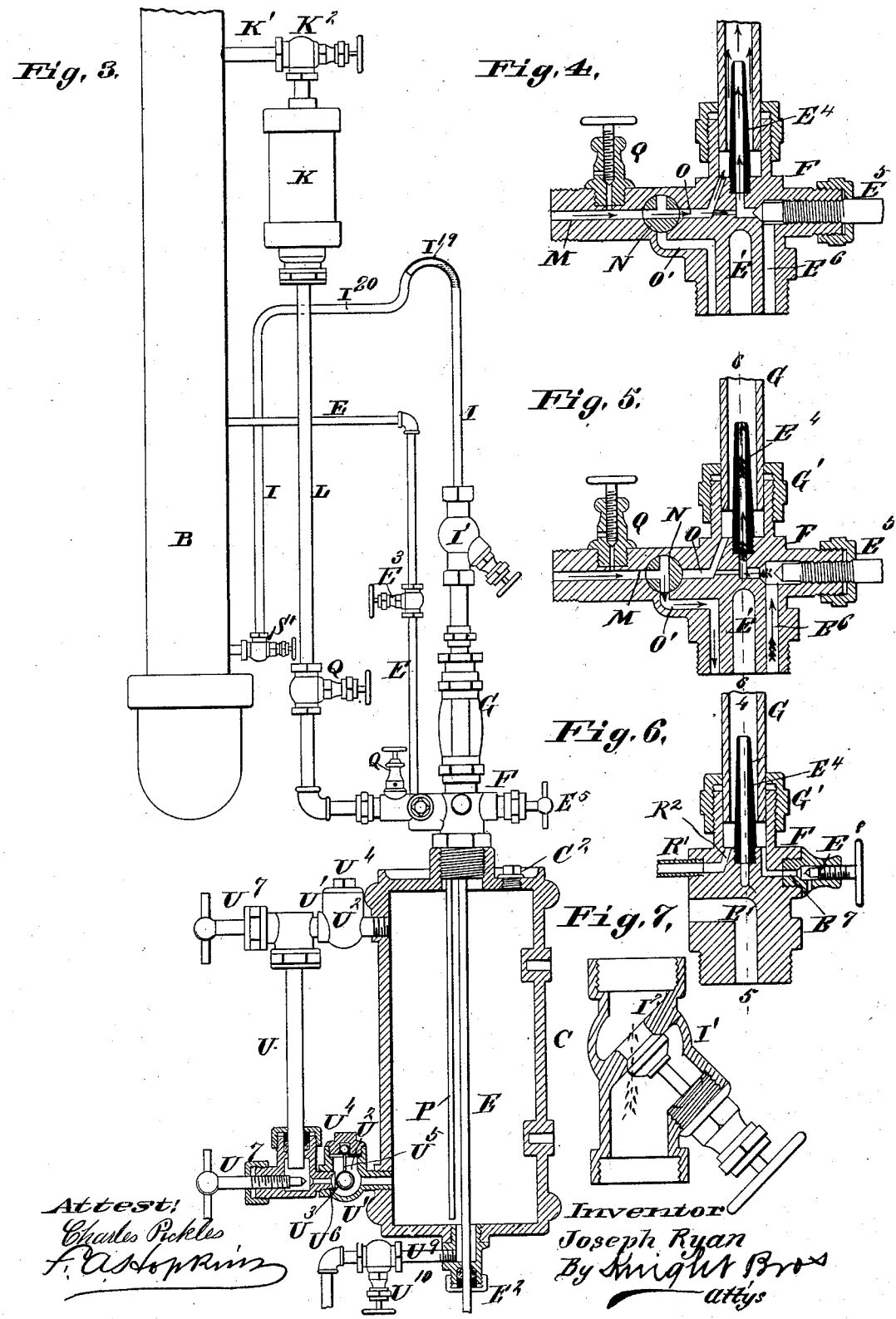

UNITED STATES PATENT OFFICE.

JOSEPH RYAN, OF ST. LOUIS, MISSOURI.

LUBRICATOR.

SPECIFICATION forming part of Letters Patent No. 363,683, dated May 24, 1887.

Application filed January 27, 1886. Serial No. 189,950. (No model.)

*To all whom it may concern:*

Be it known that I, JOSEPH RYAN, of the city of St. Louis, in the State of Missouri, have invented a certain new and useful Improvement in Lubricators, of which the following is a full, clear, and exact description, reference being had to the accompanying drawings, forming part of this specification, and in which—

Figure 1 is a side elevation illustrative of my improved lubricator. Fig. 2 is a similar view showing the lubricator under slight modification. Fig. 3 is an enlarged view of part of the lubricator adjacent to the steam-pipe and the oil-tank, showing the sight-feed, the tank being shown in vertical section. Fig. 4 is a detail vertical section of the head-piece located between the oil-tank and the sight-feed, taken on line 4 5, Fig. 6. Fig. 5 is a similar view showing the valve located between the water-pipe and the glass tube of the sight-feed in opposite position to that shown in Fig. 4. Fig. 6 is a vertical section taken on line 6 6, Fig. 5. Fig. 7 is a vertical section of the valve located in the water-pipe above the sight-feed.

My invention relates to certain improvements in lubricators adapted for a long or short distance lubrication; and my invention consists in features of novelty hereinafter fully described, and pointed out in the claims.

Referring to the drawings, A represents an engine, of any ordinary construction, which is lubricated by my improved lubricator.

B represents the steam-pipe leading to or from the engine.

C represents the oil-tank of the lubricator, which may be supported on suitable legs, C'. The oil is poured into the tank through an opening closed by a plug, $C^2$, and is kept heated within the tank by a steam-pipe, E, which extends from the pipe B down through the tank, through the head-piece F, located at the top of the tank to which the sight-feed is connected, and having a port, E', to form a communication between the two parts of the pipe E, which it divides. A stuffing-box, $E^2$, connects the lower end of the oil-tank to the steam-pipe E, as shown in Fig. 3, to prevent the escape of oil around the pipe. The steam-pipe may be provided with a valve, $E^3$, above the oil-tank, if desired, to regulate or shut off the circulation of steam. The object of this steam-pipe is to heat the oil and water within the tank, so as to keep it in as liquefied a condition as possible, thereby affording a free circulation of the oil even where the tanks and pipes are in a cold room or in cold weather.

G represents the sight-feed, which is connected to the head-piece F by a stuffing-box connection, G', as shown. The piece F has a nipple, $E^4$, that extends upward within the glass tube of the sight-feed. (See Figs. 4, 5, and 6.)

I represents a combined water and oil pipe, connected with the top of the sight-feed and forming a communication between it and the engine or the steam-pipes, if desired. I' represents a valve located in this pipe, the construction of which is represented in Fig. 7; and the form is such that the opening in the diaphragm $I^2$ that forms the seat of the valve, is in line with the pipe secured to the opposite ends of the valve, so that a free flow of oil is admitted without coming in contact with the seat, as shown by the dotted arrow, Fig. 7. A valve thus constructed has all the advantages of a globe-valve, while it has not the disadvantage of retarding the flow of oil.

K represents a main water supply or condenser connected with the steam-pipe B by a pipe, K', provided with a valve, $K^2$.

L represents a pipe whose lower end is connected with the head-piece F and communicates with a duct or port, M, formed in said piece, with branch ducts or ports O O', communicating, respectively, with the glass tube of the sight-feed and the oil-tank.

N is a three-way cock placed at the intersection of the ducts or ports M O O' for directing the fluid flowing through L M into the sight-feed tube or into the oil-tank, as may be desired. When this valve N is in the position shown in Fig. 5, the water from the water-supply condenser K passes down into the tank C and displaces the oil, it being preferably carried to near the bottom of the tank by means of a pipe, P. When the valve is turned to the position shown in Fig. 4, the flow of the water is cut off from the tank, and it passes up through the sight-feed tube and through the pipe I, for the purpose of cleaning the glass sight-tube, as well as the outer surface of the nipple $E^4$ and the pipe I, of any sediment or gum that may settle on these parts. When it is desired to clean the pipe and the sight-feed tube, the flow of oil is of course cut off by reason of the position of the cock N, as shown in Fig. 4; but as soon as the cock N is turned back, causing the water from the pipe L to pass into the oil-tank, as shown in Fig. 5, the flow of the oil resumes.

The head-piece F or pipe L is provided with an air-valve, Q, to let off any air that might accumulate in the pipe L or condenser K. The piece F is also provided with a valve, $E^5$, to control the flow of oil from the tank to the sight-feed tube through a port, $E^6$, and a port, $E^7$, with a valve, $E^8$, to allow the water to be drawn from the sight-feed tube.

R represents an auxiliary water supply or condenser connected with the steam-pipe B, or to any other suitable source for obtaining a supply of water. R' represents a pipe leading from this condenser to the head-piece F and communicating with the sight-feed at the base of the nipple $E^4$ through a port or duct, $R^2$. The water passes through this pipe R' from the condenser and causes an upward circulation through the pipe I to the engine; and this water circulating through the pipe, besides cleaning the sight-tube, insures a constant flow of the oil to the engine or other part to be lubricated, irrespective of the number of bends in the pipe and of the direction in which the pipe is bent, it only being necessary that the head of water should be such as to provide a constant pressure in the oil-pipe in the direction in which it is desired to have the oil flow.

It is of course well known that oil, owing to its lightness, will flow upward through the water, and for the same reason will not flow downward through water. Therefore by having the pipe filled with a body of moving water the oil is carried forward, whether it is moving in an upward, downward, or horizontal direction. The oil being so much lighter than the water, will be carried forward by the moving body. It will be seen that my oil-tank may be located any desired distance from the engine or part to be lubricated, and the pipe forming the communication between the tank and the part to be lubricated may be of any necessary length and passed in any direction convenience may require, so long as the part to be lubricated is not at an elevation higher than can be reached by the auxiliary water-supply.

I have shown the pipe with several bends in it in Fig. 1, and have also shown it by dotted lines with a less number of bends, and in this figure I have shown it provided with a sight-tube, S, of any suitable construction. In Fig. 2 I have shown it of a different shape and without a sight-tube, as in Fig. 1. In this figure I have shown it provided with a valve, S'. In both Figs. 1 and 2 I have shown it provided with an air-chamber, T, which is not indispensable. In Fig. 3 I have shown it of another form again, and provided with a valve, S', as shown in Fig. 2.

In Figs. 2 and 3 I have omitted the pipe R' and auxiliary condenser R, for the reason that the pipe I has no vertical part through which the oil has to flow upward except the part between the sight-feed and the bend V, and this part is kept filled with water, so that the oil will flow upward.

I have shown in Figs. 1 and 3 the pipe I with what I term a "gravity-bend," $I^{19}$, the object of which is to give momentum to the oil as it leaves the water to carry it along the horizontal part of the pipe, as shown at $I^{20}$. It is of course well known that the speed with which a fluid passes through a pipe when impelled by gravity alone depends upon the inclination of the said pipe, it being less and less as the position of the pipe approaches a horizontal. It is evident, therefore, that if the oil, after passing upward through the column of water in the pipe I, were delivered directly into a nearly-horizontal pipe its passage through would be very slow indeed; but the oil in passing down the gravity-bend acquires a momentum proportional to the fall of said bend, which aids it in its passage through the horizontal or nearly horizontal pipe $I^{20}$. This bend has been found in practice to be of great practical advantage.

The valves S' have gates $S^2$, which, should the sight-tube S be broken, will flop over (owing to the pressure behind them) against the seats $S^3$ and close communication between the pipes B and I and the atmosphere.

The oil-tank is provided with a suitable sight-indicator tube, U, to indicate the amount of the oil in the tank, and I have located valves $U^2$ in the pipes U', connecting the tube to the tank, consisting, preferably, of balls $U^3$, suspended from caps $U^4$ by ball-and-socket joints, as shown in the lower part of Fig. 3, the ball of the socket being connected to the ball $U^3$ by a stem, $U^5$. These valves hang in a vertical position at all times, except in case the sight-tube U should become broken, when the pressure in the tank will cause the balls $U^3$ to swing outward and seat themselves at $U^6$, preventing the escape of oil and water from the oil-tank. The pipes may also be provided with valves $U^7$, to make a permanent closure of the pipes in case of breakage of the sight-tubes. The tank may be provided with a pipe, $U^9$, having a valve, $U^{10}$, to draw water from the tank.

From the foregoing it will be seen that my improved lubricator depends for its operation, first, upon the introduction of water under sufficient pressure beneath the surface of the oil in the reservoir, whereby said oil is discharged from said reservoir and into the sight-feed, and, secondly, upon the pressure of water in the tube of the sight-feed and the pipe connecting it with the part to be lubricated. It has also been shown that where the pipe which conveys the oil from the sight-feed to the part to be lubricated has but a single bend upward it is only necessary that the leg through which the oil must ascend should be kept filled with water, so that the oil may pass upward by reason of its less specific gravity. Having been conducted to the highest point in the pipe by this means, it is manifest that it will descend without hinderance; but where the pipe has more than a single ascending part, it is necessary that the entire length of the pipe extending from the sight-feed to the part to be lubricated should be kept filled with water, and that the water should constantly flow in the direction in which it is desired to conduct the oil, in order that the latter may be carried along through the pipe, whatever may be its inclination or direction. In every instance it will be observed that the presence of water in the pipes is the essential requisite to the proper operation of the device. As a simple and effective means of supplying the necessary amount of water, I have shown and described condensers which are furnished with steam from the engine-boiler, and any desired means for keeping the parts named supplied with water may be employed without departing from the spirit of my invention.

This invention is very closely allied to those described in my contemporaneous applications, Serial Nos. 149,354 and 189,951, filed December 2, 1884, and January 27, 1886, respectively, only such novel features being herein claimed as are not claimed in one or the other of said applications.

I am aware that it has been proposed to connect a steam-pipe with the pipe which conveys the oil from the oil-tank to the part to be lubricated, the object being to equalize the pressure upon the oil through the apparatus; but such is not the equivalent of my present invention, which consists in discharging into said oil-pipe, at a point between the oil-tank and the part to be lubricated, a current of water which operates as a vehicle for conveying the oil through the oil-pipe regardless of the number or character of bends, whether they be upward or downward.

Having thus described my invention, the following is what I claim as new therein and desire to secure by Letters Patent:

1. In a lubricator, the combination, with the oil-tank C, a pipe for conveying the oil therefrom to the part to be lubricated, and means for forcing the oil from said tank into said pipe, of an auxiliary water-supply, R, and a pipe, R', connecting said auxiliary water-supply with the oil-pipe between the oil-tank and part to be lubricated, causing a stream of water to flow through said oil-pipe, substantially as and for the purpose set forth.

2. In a lubricator, the combination, with the oil-tank C and a pipe for conveying the oil therefrom to the part to be lubricated, of a water-supply, K, pipe L, communicating therewith and with the head-piece F of the tank, having branches O and O', communicating with said oil-pipe and the tank C, respectively, and a valve, N, at the intersection of said branches, substantially as set forth.

3. In a lubricator, the combination, with the oil-tank C, the sight-tube, and the nipple $E^4$, projecting thereinto, of a water-supply, K, pipe L, communicating with the head-piece F, having branches O and O' leading, respectively, to the base of the nipple $E^4$ and the bottom of the tank, and a valve, N, for controlling the flow of water through said branches, substantially as set forth.

4. In a lubricator, the combination of an oil-tank, C, placed remote from the part to be lubricated, a main water-supply, K, a pipe, L, forming communication between said water-supply and the cap-piece F of the oil-tank, oil-pipe I, bent to meet the requirements of each particular case and forming communication between said tank and the part to be lubricated, an auxiliary supply, R, and a pipe, R', communicating therewith and with the pipe I between the oil-tank and the part to be lubricated, causing a stream of water to flow through said oil-pipe, substantially as set forth.

5. In a lubricator, the combination of an oil-tank, C, placed remote from the part to be lubricated, a main water-supply, K, and pipe L, communicating therewith and with the cap-piece F of said oil-tank, oil-pipe I, forming communication between said oil-tank and the part to be lubricated, and having the sight-feed G and an auxiliary water-supply, R, and pipe R', communicating therewith and with said pipe I at the base of the sight-tube, causing a stream of water to flow through said oil-pipe, substantially as and for the purposes set forth.

6. In a lubricator, the combination, with the oil-tank, a pipe for conveying the oil therefrom to the part to be lubricated, and means for forcing the oil from said tank into said pipe, of a second pipe communicating with the oil-pipe at a point between the oil-tank and part to be lubricated, and a water-supply with which said pipe communicates for causing a flow of water through the oil-pipe, substantially as and for the purpose set forth.

7. In a lubricator, the combination, with the oil-tank C, the indicator-tube U, and the short pipes U', connecting said indicator-tube and tank, of the ball-valve $U^3$, having a stem, $U^5$, by which it is suspended, and the cap $U^4$, from which said stem is supported by universal joint, substantially as set forth.

8. In a lubricating apparatus, the combination of an oil-tank placed remote from the part to be lubricated, a pipe for conveying the oil therefrom, having a number of upwardly-inclined parts, means for forcing the oil from the oil-tank into the oil-pipe, and a water-supply having a pipe connecting it with said oil-pipe between the oil-tank and the part to be lubricated, whereby a current is produced through said oil-pipe in the direction in which it is desired to convey the oil, substantially as set forth.

JOSEPH RYAN.

In presence of—
GEO. H. KNIGNT,
EDW. S. KNIGHT.